W. B. FISHER.
Improvement in Seed-Steaming Apparatus.
No. 129,018. Patented July 16, 1872.
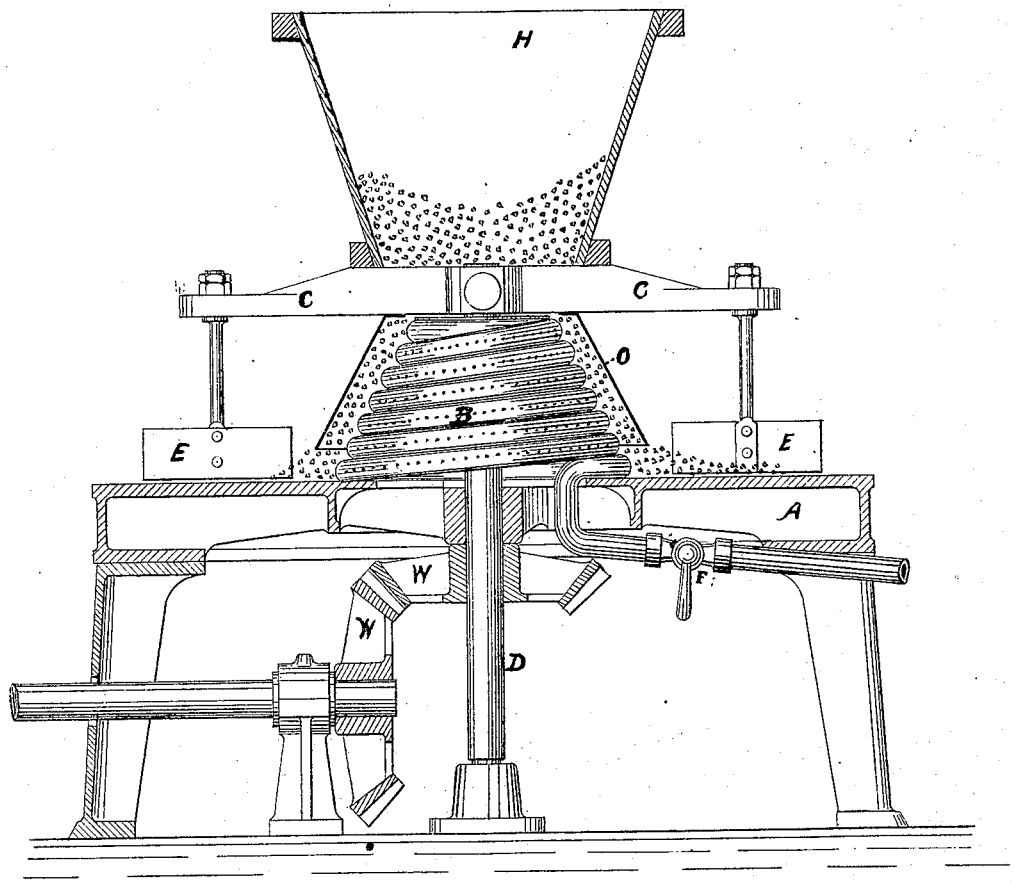

UNITED STATES PATENT OFFICE.

WILLIAM B. FISHER, OF NEWARK, NEW JERSEY.

IMPROVEMENT IN SEED-STEAMING APPARATUS.

Specification forming part of Letters Patent No. 129,018, dated July 16, 1872.

*To all whom it may concern:*

Be it known that I, WILLIAM B. FISHER, of the city of Newark, county of Essex, in the State of New Jersey, have invented a new and useful Process for Preparing Seeds for Storing and for the operation of pressing; and I do hereby declare that the following specification, in connection with the drawing furnished, is a full, clear, and exact description thereof, that will enable others skilled in the art to make and use the same.

The nature of my invention consists in constructing an apparatus for treating oleaginous seeds and nuts, so that the latter may be in continuous motion while undergoing treatment, passing over the sides of an inclined or conical steam-coil, provided with small holes, from which issue jets of steam with a sufficient force to permeate and cleanse the entire mass. A jacket is provided for partly confining the steam during treatment for the press, and a screen when treating the seed for storage or shipment.

To enable others skilled in the art to make and use my invention, I will describe its arrangement and operation.

A is a bed or base; B, a steam-coil; C, extended arms secured to a rotating shaft, D, with scrapers E E attached; F, a stop-cock for admitting steam to the coil; H, a hopper to guide the seed to the top of the coil; O, a close jacket or wire-screen surrounding the same. The steam-coil B is provided with numerous small holes (indicated in the drawing by dots) countersunk slightly to cause the escaping steam to spread that it it may thoroughly permeate the mass of seed moving over the same from above to the table, where it is removed by the scrapers E E. The scrapers E E are so connected to the arms C that they may be adjusted to an incline to clear the seed from the table rapidly or slowly at the will of the operator. They may be made of sheet metal or wood. Steam is conducted to the coil from a boiler in the usual manner. Power is transmitted to the shaft D, which carries the arms C C and scrapers E E in the usual way. The close jacket O, for convenience, is made of sheet metal, and is used to partially confine the steam, when desirable, in order to add moisture to the seed to fit it for the operation of pressing. For cleansing and drying the seed a perforated jacket or wire screen may be used, which allows the steam to pass through and off rapidly, carrying with it the impurities and excess of moisture previously contained therein, leaving the same sweet and thoroughly cleansed. In preparing for storage or shipment it is considered preferable to use steam at a pressure of about sixty pounds, as its force when issuing from the small holes in the coil does the cleansing and removes all objectionable accumulated matter while the high temperature accomplishes the drying. Thus the causes of fermentation are removed, a source of so much trouble in packing and storing in bulk.

For the operation of pressing a lower temperature will suffice, as moisture is desirable to be added in such case to soften the vegetable fibers of the seed and liquefy the oily parts, so that the separation of the one from the other is easily accomplished.

Having thus described my invention, what I claim, and desire to secure by Letters Patent of United States, is—

1. The combination of the hopper H, perforated conical steam-coil B, jacket O, shaft D, and rotating arms C C, carrying scrapers E E, constituting an improved apparatus for treating oily seeds, as and for the purpose herein set forth.

2. The improved method of cleaning and drying oleaginous seed by feeding the same over the inclined surface of a perforated conical steam-coil, substantially in the manner described.

.WILLIAM B. FISHER. [L. S.]

Witnesses:
    JOHN DANE, Jr.,
    WILLIAM T. ALLING.